(12) United States Patent
Oh

(10) Patent No.: US 8,090,968 B2
(45) Date of Patent: Jan. 3, 2012

(54) APPARATUS AND METHOD FOR POWER MANAGEMENT CONTROL

(75) Inventor: Jang-Geun Oh, Seoul-si (KR)

(73) Assignee: LG Electronics Inc., Seoul (KR)

( * ) Notice: Subject to any disclaimer, the term of this patent is extended or adjusted under 35 U.S.C. 154(b) by 660 days.

(21) Appl. No.: 12/184,755

(22) Filed: Aug. 1, 2008

(65) Prior Publication Data

US 2009/0158069 A1 Jun. 18, 2009

(30) Foreign Application Priority Data

Dec. 12, 2007 (KR) ........................ 10-2007-0128724

(51) Int. Cl.
*G06F 1/26* (2006.01)
*G06F 1/32* (2006.01)
(52) U.S. Cl. ........ 713/323; 713/300; 713/320; 709/220; 709/221
(58) Field of Classification Search .................. 713/300, 713/320, 323; 709/220, 221
See application file for complete search history.

(56) References Cited

U.S. PATENT DOCUMENTS

| | | | | |
|---|---|---|---|---|
| 6,516,418 | B1 * | 2/2003 | Lee | 713/320 |
| 7,539,883 | B2 * | 5/2009 | Kojou et al. | 713/320 |
| 2006/0271651 | A1 * | 11/2006 | Tseng et al. | 709/220 |

* cited by examiner

*Primary Examiner* — Thuan Du
*Assistant Examiner* — Michael J Brown
(74) *Attorney, Agent, or Firm* — Birch, Stewart, Kolasch & Birch, LLP

(57) ABSTRACT

A power management control apparatus including a memory unit configured to store a program for disabling a previously determined Link power management state when a system enters a specific operating state and for enabling the disabled Link power management state when the system is resumed, a processor configured to access the memory unit and to execute the program, and a control unit connected to the processor and the memory unit and configured to manage Link power based on a result of executing the program.

42 Claims, 11 Drawing Sheets

APPARATUS AND METHOD FOR POWER MANAGEMENT CONTROL

CROSS REFERENCE TO RELATED APPLICATION

This application claims priority to Korean Application No. 10-2007-0128724, filed in Korea on Dec. 12, 2007, the entire contents of which are hereby incorporated in its entirety.

BACKGROUND OF THE INVENTION

1. Field of the Invention

The present invention relates to power management control, and more specifically, to an apparatus and method for power management control, wherein each power management state related to a Link that is in an active state between a chipset and a device, for example, an L0s and L1 state of Active State Power management (ASPM), which is a power management specification related to a Link between a chipset and a device, is disabled when a system enters a predetermined operating state, for example, an S3 or S4 state, and the disabled ASPM state (L0s or L1) is reactivated when the system is resumed, thereby supporting the L0s and L1 states which are Link power management states between the chipset and the device.

The Link between the chipset, i.e., a control unit, and the device is a Link of a PCI Express (PCI-E) scheme, and the power management ASPM states (L0s and L1) are power management states of the PCI-E.

2. Description of the Related Art

Hereinafter, a related art of the present invention will be described.

Recently, Links between chipsets such as north and south bridges and various devices of a computer system are established in a PCI Express (hereinafter, referred to as PCI-E) scheme. With the introduction of PCI-E, performance aspects such as data transmission speed between the chipsets and devices are greatly improved. However, there is a problem in that power consumed by the Links is also increased.

Accordingly, ASPM is proposed as a power management specifications of the Links between chipsets and devices. ASPM defines power management states of L0, L0s, L1, L2, and L3. When a system is in a normal operating state, i.e., when the system does not enter a standby mode, three states of L0, L0s, and L1 among the power management states may be supported.

Conventionally, ASPM states of a system are basically enabled or disabled by a BIOS regardless of an operating state of the system. Although the L0s and L1 states supported when a system is in a normal operating state (e.g., an S0 state of the ACPI power management specification) are functions basically supported by chipset manufacturers, states supported by chipset manufacturers may be different depending on completeness of a system and sometimes invite instability of the system.

Particularly, in a case where a Link power management state, i.e., L0s or L1 of ASPM, or both of them, between a control unit and a device of a system is enabled while the system is in a normal operating state, if the system operating state enters a standby mode (S3 or S4 of the ACPI power management specification), the Link power management state also enters L2 or L3. Then, the Link power management state may be any one of L0, L0s, and L1 states in the process of resuming the system operating state, which invites instability of the system, and thus a system hang (a phenomenon of halting the system) or Blue screen may occasionally occurs.

Accordingly, BIOSs are frequently designed not to support the ASPM functions or the L0s and L1 states between a chipset (north/south bridge), i.e., a control unit, and PCI Express devices (e.g., a video controller, Ethernet device, and wireless LAN).

Although the specification of I company is referred to for the terminologies and operation and power states described above, some terminologies are arbitrarily selected by the applicant in some specific cases. Since their operations and meanings are described in detail in corresponding descriptions of the invention, it is noted that the present invention should be understood through the operations and meanings of the terminologies, not merely by the terms of the terminologies.

SUMMARY OF THE INVENTION

The present invention proposes to control a power management state of a Link between a control unit (chipset) and a device based on mode transfer to a specific operating state of a system.

According to the present invention, there is proposed a power management apparatus and method, in which power management states related to a Link between the control unit and the device, for example, L0s and L1 states are disabled when a system enters a predetermined operating state, e.g., the S3 or S4 state defined in ACPI, and the disabled power management states (L0s and L1) of the Link are activated when the system is resumed, thereby preventing unstable system resumption and supporting the L0s and L1 states, which are power management states of a Link between the control unit and the device.

In the present invention, in the S3 or S4 state that is an operating state of the system, the Link power management states of the ASPM are designed to support the L2 or L3 state as the power management state of PCI-E for a Link between a chipset (north/south bridge), i.e., a control unit, and a device enters the S3 or S4 state.

Accordingly, although each power state related to a Link between a chipset and a device, e.g., ASPM that is the power management state for managing the L0s and L1 states, is disabled when the system enters the S3 or S4 state, there may be no problem since the L2 and L3 states are supported.

When the system returns to a normal operating state, the L0s and L1 states are not supported until the system returns to the normal operating state so that the Link power management state can also stably return to one state (e.g., to the L0 state).

However, when the system is resumed and the operating state of the system returns to the S0 state, the L0s and L1 states of the Link power management states according to ASPM are reactivated to be used.

In implementing the present invention, since the operation of the ASPM at PCI-E input and output interfaces is directed by a BIOS, there is proposed a driver that can operate the ASPM in cooperation with the BIOS.

In addition, it is proposed in the present invention that the ASPM mechanism transits power of the Link of the device in an idle state in the physical layer protocol to a lower power state, e.g., the L0 or L1 state, when a corresponding device continues an idle state for a predetermined period of time or more while the operating state of the respective connected devices is in a predetermined state such as the D0 state (full on or device active).

Meanwhile, it is proposed to transit the ASPM to the L0 state again when the operating state of a device is changed to the D0 state by generation of traffic from any one portion (chipset or device) of the Link while the ASPM is in the L0s or L1 state.

It is proposed to detect change of the operating states of the system and/or the device by a driver and transit the power state of the ASPM by the BIOS based on a command from the driver of the WMI-ACPI.

In addition, the present invention proposes to control the ASPM by a related application program, the BIOS, a user, or the like based on a use state of the system, a type of power, the remaining amount of a battery, or the like.

A power management control apparatus according to the present invention for achieving the objects comprises a memory unit for storing a program, the program disabling a previously determined Link power management state when a system enters a specific operating state and enabling the disabled Link power management state when the system is resumed; a processor for accessing the memory unit and executing the program; and a control unit connected to the processor and the memory unit to manage Link power based on a result of executing the program.

In addition, a power management control method according to the present invention comprises the steps of: A) detecting a change of an operating state of a system; B) broadcasting the operating state being changed; C) receiving the broadcast; D) confirming whether a current Link power management state is enabled or disabled; and E) directing to enable or disable a previously determined Link power management state depending on a result of receiving and confirming of steps C and D.

The power management control apparatus and method according to the present invention as described above has advantageous effects in that a predetermined Link power management state is disabled when the system enters a specific state and the disabled power state is enabled after the system returns to a normal operating state, so that a system hang is prevented from occurring when the system returns to the normal operating state, and thus, a variety of Link power management states (e.g., L0, L0s, and L1) can be provided in the normal operating state to thereby save power of a Link.

Furthermore, in the present invention, the Link power management states are set according to on or off control based on operation policies of the system and/or the type of supplied power, whereby the power can be efficiently used.

DESCRIPTION OF THE PREFERRED EMBODIMENTS

Figure 1:
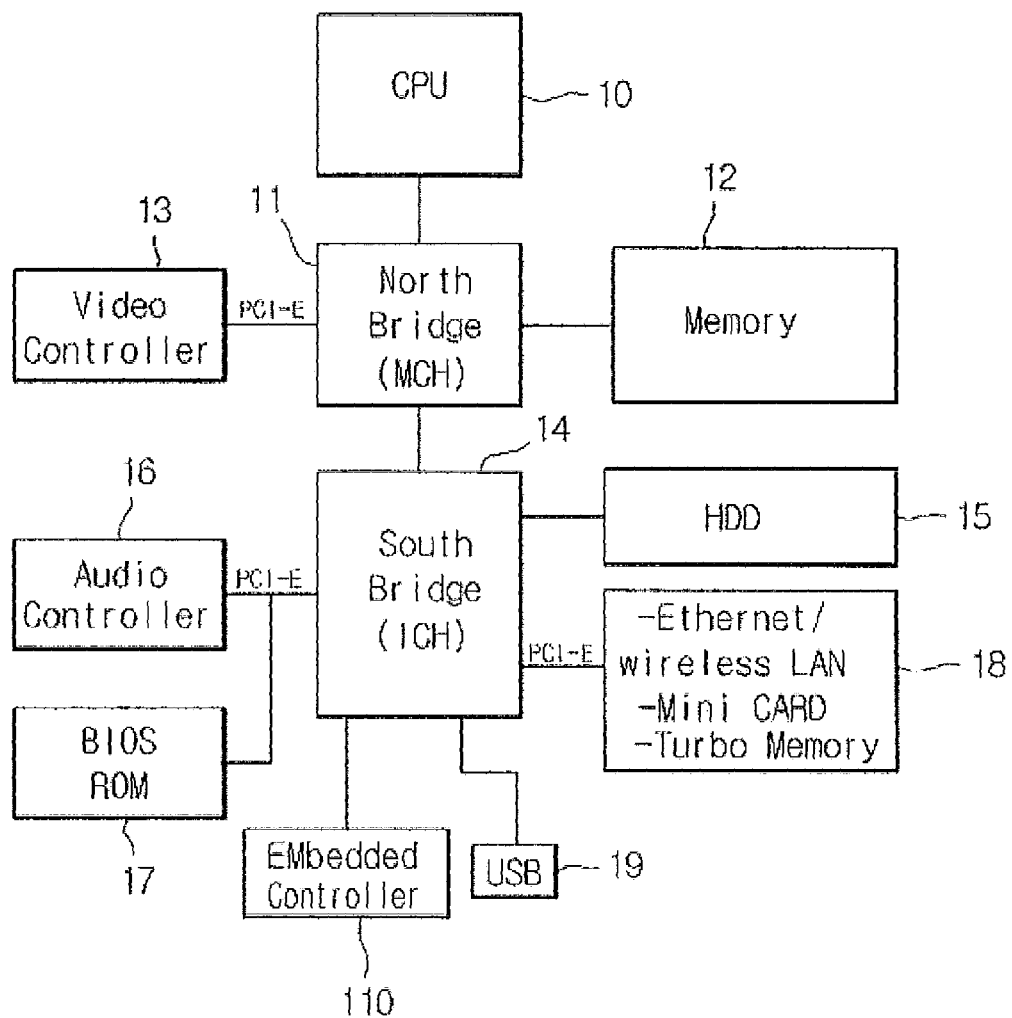
FIG. 1 is a system block diagram of an embodiment in which a Link between a chipset (north/south bridge), i.e., a control unit, and a device is implemented in a PCI-E method.

Hereinafter, a power management control apparatus and method according to the present invention will be described in detail with reference to the accompanying drawings.

First, the term "ASPM" referred to in the present invention represents power management of a Link between a chipset of a PCI-E scheme (north or south bridge, hereinafter referred to as a control unit) and a device.

Hereinafter, the system operating state means a state of a system classified into a plurality of modes according to a state of power, clock, and the like provided to the system, for example, classification of a system state into such as S0 to S5 states in ACPI power management.

In addition, the device operating state means a state of a device classified into a plurality of modes according to the states of power and the like supplied to the device, for example, classification of a system state into such as D0 to D3 states in ACPI power management.

L0, L0s, L1, L2, and L3 respectively represent power management states of PCI-E supported by the ASPM and will be referred to as Link power management states.

General terminologies widely used at present are selected as terminologies used in the present invention if possible. However, some terminologies are arbitrarily selected by the applicant in some specific cases, and their operations and meanings are described in detail in corresponding descriptions of the invention. Thus, it is noted that the present invention should be understood through the operations and meanings of the terminologies, not merely by the general meaning of the terms.

The present invention will be generally described based on one embodiment.

The speed and performance of a data bus scheme is greatly improved with the appearance of PCI-E.

However, power consumed at the PCI-E Link (a bus) between a chipset, i.e., a control unit, and a device is greatly increased accordingly.

ASPM is a power management specification for PCI-E Links between the control unit and PCI-E devices.

In the ASPM, states may be divided into L0, L0s, L1, L2, and L3, and a system may enter the L0, L0s, or L1 state while working. Accordingly, the entry up to the L1 state is an essential requisite in the aspect of power management.

However, this can be supported or not depending on the performance of a PCI-E Link device.

Most of problems arise when a system is resumed after entering the S3 state (suspend), the S4 state (hibernation), the S5 state (all power lost except wakeup on ICH), or the like. When the ASPM is supported up to the L0s or L1 state, a critical error such as a system hang or blue screen may occur, and thus many systems do not support the L0s and L1 states due to such a problem.

When the L0s and L1 states of the ASPM are supported, no problem occurs while the system is in a working state. However, if the ASPM is supported up to the L0s or L1 state when the system is resumed after entering the S3 state (suspend), the S4 state (hibernation), or the S5 state, since the problem occurs as described above, an object of the present invention is to remove an unreasonable element of the system not supporting the ASPM.

Accordingly, in the present invention, when the system enters the S3 or S4 state, the enabled L0s or L1 state of the ASPM is disabled, and the L0, L2, or L3 state of the ASPM is enabled. Therefore, a failure in the operation of the system is prevented from occurring.

That is, using an application program (hereinafter, referred to as a battery miser) including a driver that can support ASPM through Windows Management Instrumentation-Advanced Configuration and Power interface (WMI-ACPI), the operating system controls each Link power management state of the ASPM in association with the BIOS, and thus, functions of the ASPM are normally used.

The management functions of the ASPM may be applied to all types of currently supplied power, such as battery power and AC power.

The present invention as described above is most effective when an external graphic card is used, in which a power saving effect can be obtained as much as 1 to 3 Watts.

In addition, a device connected through the PCI-E obtains a power saving effect in proportion to the power consumption level of the device. Further, the present invention can be used to conform to an Energy Star specification while AC power is supplied.

Hereinafter, the present invention will be described with reference to the accompanying drawings.

FIG. 1 is a system block diagram of an embodiment in which a Link between a chipset (north/south bridge), i.e., a control unit and a device is implemented in a PCI-E scheme.

As shown in the figure, the system is configured by interconnecting a central processing unit (CPU) 10, a north bridge 11, and a south bridge 14. At this time, a video controller 13 connected to the CPU 10 to control video processing and a system memory 12 such a RAM or the like are connected to and controlled by the north bridge 11. In addition to peripheral devices, such as a hard disk drive (HDD) 15, an audio controller 16, BIOS ROM 17 and Ethernet/wireless LAN/minicard/turbo memory 18, a universal serial bus (USB) 19, and the like are connected to and controlled by the south bridge 13. There is also provided an embedded controller 110 for controlling an input means, such as a keyboard, touchpad, or the like.

A Link between the control unit (north/south bridge) 11 or 14 and a PCI Express device is established by the PCI-E, and the PCI-E supports power management called as Active State Power Management (ASPM). In the meantime, with the appearance of the PCI-E, the speed and performance are greatly improved, but power consumed at a PCI-E Link between a chipset, i.e. a control unit, and a device is greatly increased. Accordingly, the ASPM is proposed as a power management specification of the Link, and power management states in the ASPM are generally classified into L0, L0s, L1, L2, and L3.

In most cases, since ASPM of the PCI-E operates as directed by the BIOS, its operation cannot be practically performed if the BIOS does not support even though the Windows operating system directs power management. Therefore, a driver connected with the BIOS, e.g. the battery miser, operates the ASPM in association with the BIOS.

In the present invention, the BIOS sets the Link power management state of the ASPM to be enabled or disabled according to a control command of the driver.

In the aforementioned configuration, the HDD 15 stores the battery miser program including a driver operating the ASPM in association with the BIOS and/or a filter driver for detecting devices and/or programs currently used in the system, and they operate as Windows application programs in the system memory 12.

That is, the operating system executed by the CPU 10 executes the battery miser stored in the system memory 12, and the battery miser performs Link power management in association with the filter driver and/or the BIOS.

Alternatively, an additional processor for executing a program, such as the battery miser, that includes a driver for operating ASPM is provided to perform the Link power management.

It is also possible to identify currently operating PCI Express devices using the filter driver and to set the ASPM for every device.

Here, the function by which the filter driver recognizes devices for performing the ASPM functions is expressed as follows:

BOOL Set Device for ASPM( );
Return Value
Nonzero if the device is successful; otherwise 0.

The function is performed for power management on currently operating devices according to the ASPM. Accordingly, the filter driver may hook the function to thereby find out currently operating devices.

In addition, the present invention is provided with the BIOS ROM 17 into which the BIOS is embedded, wherein the BIOS recognizes and sets hardware devices in the system after the system is booted, processes system booting, searches for and operates the operating system, and controls (enables/disables) the ASPM in association with the battery miser.

Transmission and reception of data between the control unit and each device in FIG. 1 is performed through the PCI-E.

Figure 2:
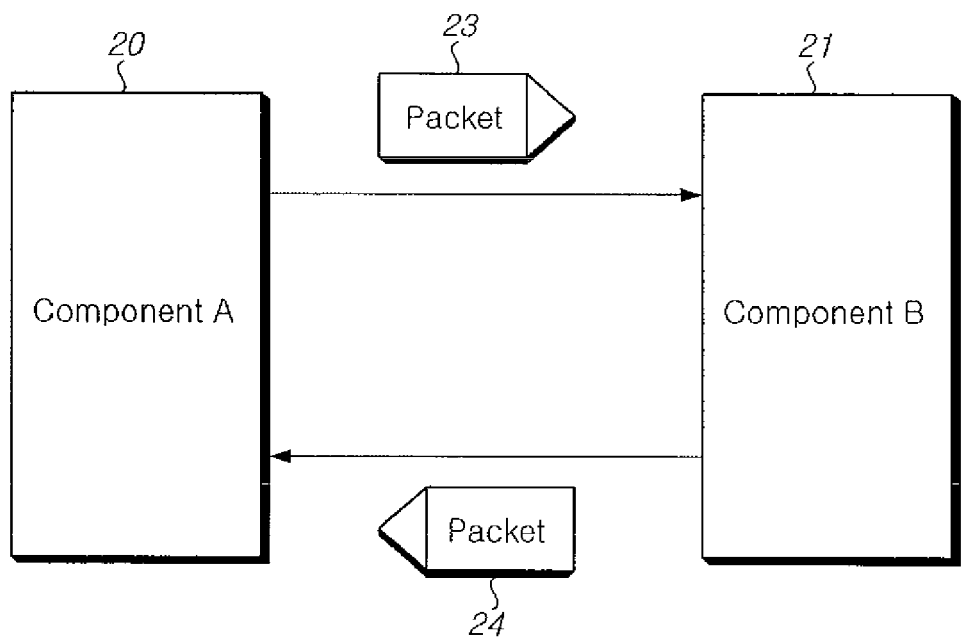
FIG. 2 is a block diagram showing that components A and B are linked through the PCI-E to transmit and receive data, e.g., packets 23 and 24, as an embodiment of the present invention.

FIG. 2 is a block diagram showing that components A and B are linked through the PCI-E to transmit and receive data, e.g., packets 23 and 24, as an embodiment of the present invention.

As shown in the figure, transmission and reception of receive packet data 23 and 24 between the components A and B 20 and 21 is performed through the PCI-E scheme.

The PCI-E Link is implemented by a dual-simplex communications channel (which is a structure having two unidirectional data buses configured as a pair, in which one bus is used only to receive, and the other bus is used only to transmit data) between the components A and B 20 and 21.

A Link represents a dual-simplex communications channel between two components. The fundamental PCI Express Link consists of two, low-voltage, differentially driven signal pairs: a Transmit pair and a Receive pair as shown in FIG. 2.

Details in connection with the PCI-E Link of FIG. 2 will be described below.

The basic Link: PCI Express Link consists of dual unidirectional differential Links, implemented as a Transmit pair and a Receive pair. A data clock is embedded using an encoding scheme to achieve very high data rates.

Signaling rate: Once initialized, each Link must only operate at one of the supported signaling levels. For the first generation of PCI Express technology, there is only one signaling rate defined, which provides an effective 2.5 Gigabits/ second/Lane/direction of raw bandwidth. The data rate is expected to increase with technology advances in the future.

Lanes: A Link must support at least one Lane: each Lane represents a set of differential signal pairs (one pair for transmission, one pair for reception). To scale bandwidth, a Link may aggregate multiple Lanes denoted by xN where N may be any of the supported Link widths. An x8 Link represents an aggregate bandwidth of 20 Gigabits/second of raw bandwidth in each 20 direction. This specification describes operations for x1, x2, x4, x8, x12, x16, and x32 Lane widths.

Initialization: During hardware initialization, each PCI Express Link is set up following a negotiation of Lane widths and frequency of operation by the two agents at each end of the Link.

Symmetry: Each Link must support a symmetric number of Lanes in each direction, i.e., an x16 Link indicates there are 16 differential signal pairs in each direction.

Figure 3:
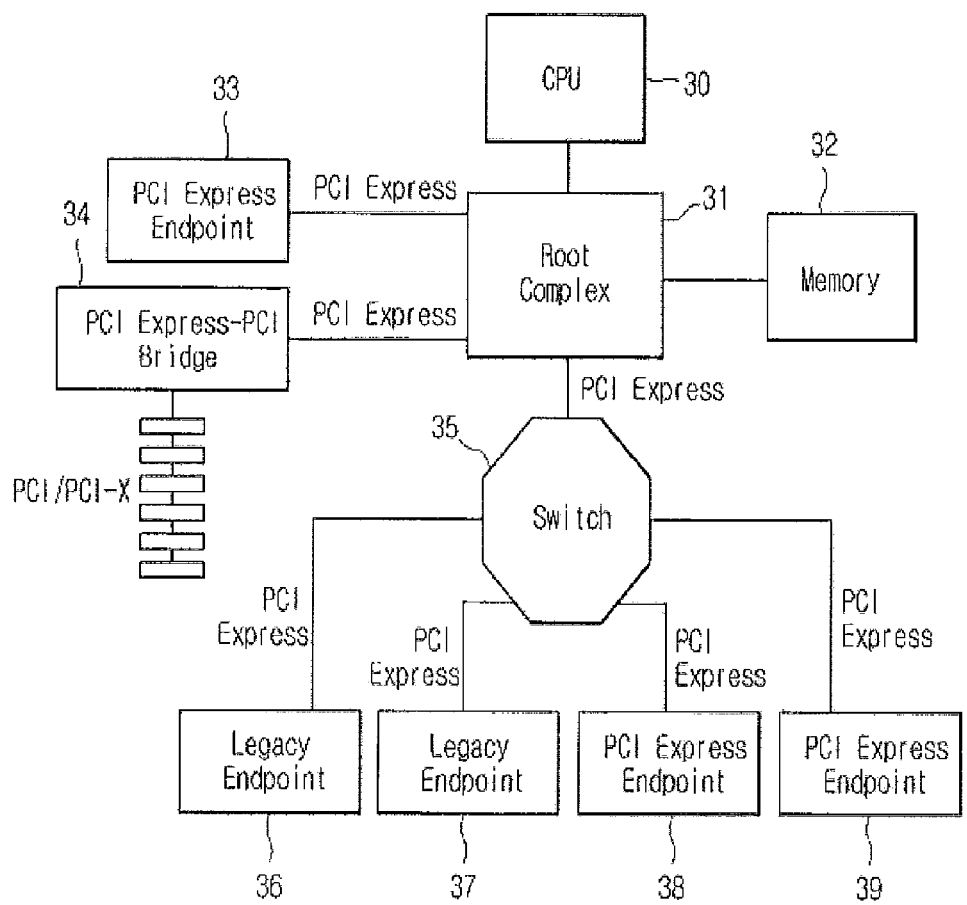
FIG. 3 is a view showing a PCI-E structure (fabric topology) according to another embodiment of the invention.

FIG. 3 is a view showing a PCI-E structure (fabric topology) according to another embodiment of the invention.

As shown in the figure, the PCI-E comprises a central processing unit (CPU) 30, and a root complex 31 connected to the CPU, a memory 32, and devices 33 and 34.

In the meantime, since the PCI-E can be configured only in a pure point-to-point (P2P) form (serial communication), a switching means 35 can be used in order to be connected with other devices. That is, the root complex 31 may include a virtual or real switching means 35 for P2P connections with other devices 36 to 39.

In addition, the switching means may be configured to be separated from the root complex. Accordingly, the PCI-E may be guaranteed high I/O performance together with high expandability through the structure of the switching means.

Followings are supplementary descriptions on the PCI-E block diagram of FIG. 3.

A fabric shown in FIG. 3 is composed of point-to-point Links that interconnect a set of components. This figure illustrates a single fabric instance referred to as a hierarchy: composed of a Root Complex (RC), multiple Endpoints (I/O devices), a Switch, and a PCI Express-PCI bridge, all interconnected via PCI Express Links.

1) Root Complex

A Root Complex (RC) denotes the root of an I/O hierarchy that connects the CPU/memory subsystem to the I/O. As illustrated in FIG. 3, a Root Complex may support one or more PCI Express Ports. Each interface defines a separate hierarchy domain. Each hierarchy domain may be composed of a single Endpoint or a sub-hierarchy containing one or more Switch components and Endpoints. The capability to route peer-to-peer transactions between hierarchy domains through a Root Complex is optional and implementation dependent. For example, an implementation may incorporate a real or virtual Switch internally within the Root Complex to enable full peer-to peer support in a software transparent way. Unlike the rules for a Switch, a Root Complex is generally permitted to split a packet into smaller packets when routing transactions peer-to-peer between hierarchy domains (except as payload each. The resulting packets are subject to the normal packet formation rules contained in this specification (e.g., Max_Payload_Size, Read Completion Boundary, etc.). Component designers should note that splitting a packet into smaller packets may have negative performance consequences, especially for a transaction addressing a device behind a PCI Express to PCI/PCI-X bridge.

Exception: A Root Complex that supports peer-to-peer routing of Vendor_Defined Messages is not permitted to split a Vendor_Defined Message packet into smaller packets except at 128 byte boundaries (i.e., all resulting packets except the last must be an integral multiple of 128 bytes in length) in order to retain the ability to forward the Message across a PCI Express to PCI/PCI-X bridge. A Root Complex must support generation of configuration requests as a Requester. A Root Complex is permitted to support the generation of I/O requests as a Requester. A Root Complex must not support Lock semantics as a Completer. A Root Complex is permitted to support generation of Locked Requests as a Requester.

2) Endpoints

Endpoint refers to a type of device that can be the Requester or Completer of a PCI Express transaction either on its own behalf or on behalf of a distinct non-PCI Express device (other than a PCI device or Host CPU), e.g., a PCI Express attached graphics controller or a PCI Express-USB 20 host controller. Endpoints are classified as either legacy, PCI Express, or Root Complex Integrated Endpoints.

Figure 4:
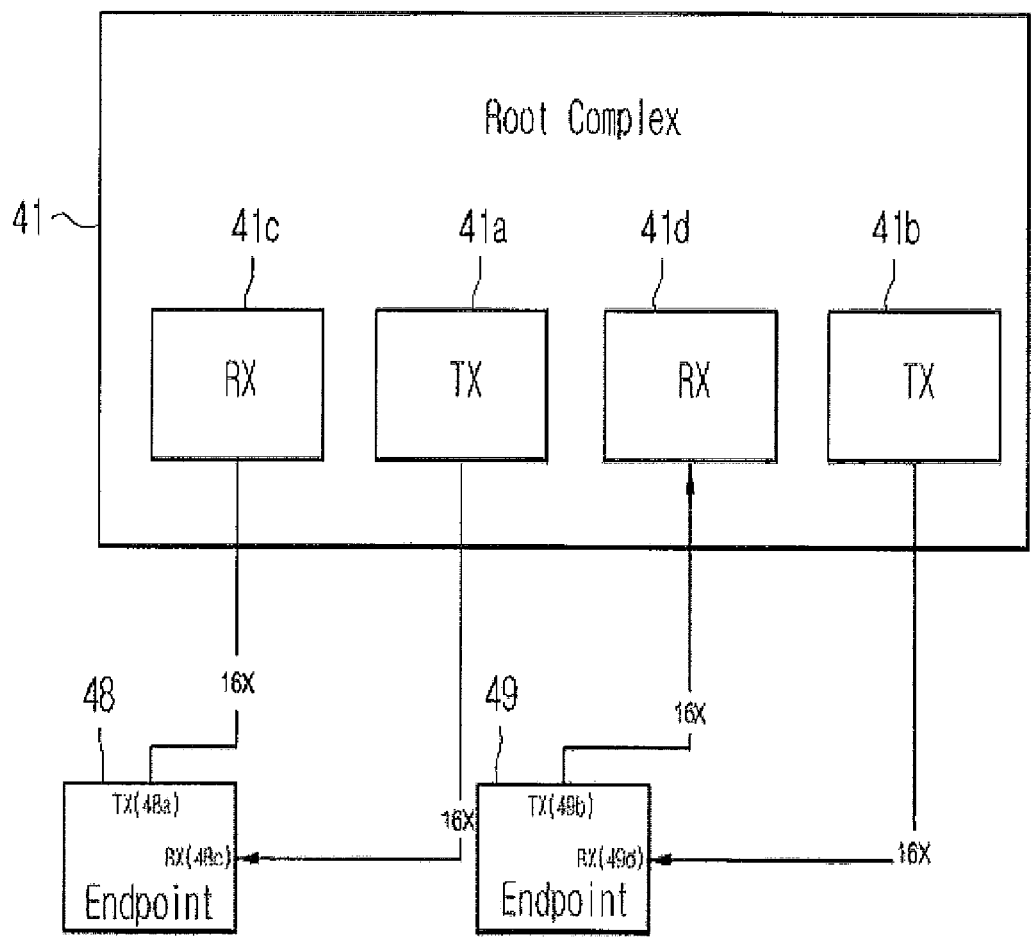
FIGS. 4 and 5 respectively show a case using a switch and a case using no switch in the PCI-E structure (fabric topology) of FIG. 3.
Figure 5:
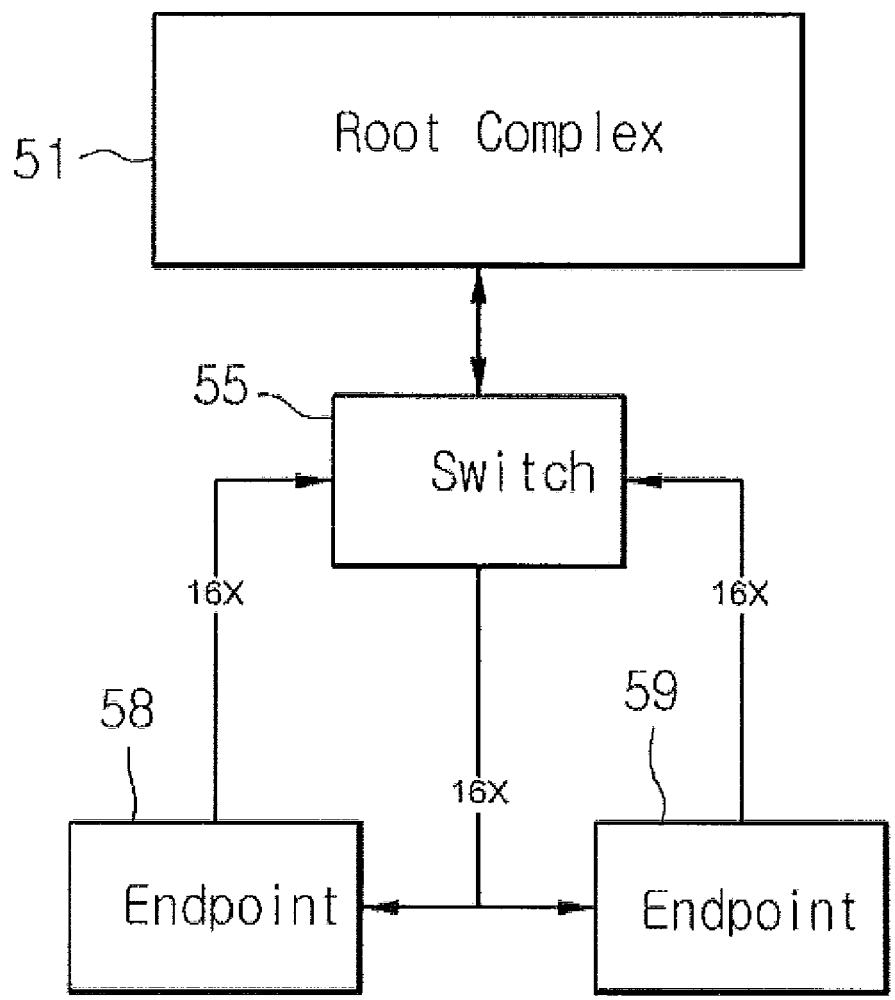

FIGS. 4 and 5 respectively show a case using a switch and a case using no switch in the PCI-E structure (fabric topology) of FIG. 3.

First, FIG. 4 in which a switch is not used in implementing the PCI-E scheme of the present invention will be described.

In the ASPM of the PCI-E, the L0s and L1 states are to support power saving in the system operating state S0 or the device operating state D0.

As shown in FIG. 4, the root complex 41 corresponds to the control unit (north or south bridge 11 or 14) of FIG. 1, and Endpoints 48 and 49 correspond to the devices 13, 16, and 18 of FIG. 1.

For example, when the root complex 41 communicates with each of the devices 48 and 49 in the PCI-E scheme, although the device operating state is the D0 state, data communications may not be continued in both directions.

That is, if an idle Link time is longer than a predetermined time in the D0 state, one or more PCI communication interface units of both Endpoints for the PCI-E and the PCI-E Link may enter the L0s or L1 state to save power.

As an example, if an ASPM state of the PCI-E enters the L0s or L1 state, the clock of the PCI communication interfaces of the control unit and the devices is controlled to be lower than in the S0 or D0 state to save power consumption in implementing the PCI-E.

In the meantime, if it is known that there is bidirectional data communication by a certain interrupt in transmitting and receiving data or the like, the PCI communication interfaces transit to the L0 state again to start communication.

Here, power states defined in the power management ASPM of the PCI-E will be described in detail below.

PCI Express-PM (ASPM) defines the following Link power management states:

1) L0: Active state.

All PCI Express transactions and other operations are enabled. L0 support is required for both ASPM and PCI-PM compatible power management.

2) L0s: A low resume latency, energy saving standby state. L0s support is required for ASPM. It is not applicable to PCI-PM compatible power management. All main power supplies, component reference clocks, and components' internal PLLs (Phase Lock Loops) must be active at all times during L0s. TLP (Transaction Layer Packet) and DLLP (Data Link Layer Packet) communication through a Transmitter that is in L0s is prohibited. The L0s state is used exclusively for ASPM. The PCI Express Physical Layer provides mechanisms for quick transitions from this state to the L0 state. When common (distributed) reference clocks are used on both sides of a given Link, the transition time from L0s to L0 is typically less than 100 Symbol Times.

In the meantime, it is possible for the Transmit side of one component on a Link to be in L0s while the Transmit side of the other component on the Link is in L0.

3) L1: Higher latency, lower power standby state. L1 support is required for PCI-PM compatible power management. L1 is optional for ASPM unless specifically required by a particular form factor. All platform provided main power supplies and component reference clocks must remain active at all times during L1. The component internal PLLs may be shut off during L1, enabling greater energy savings at a cost of increased exit latency. The L1 state is entered whenever all functions of a Downstream component on a given PCI Express Link are either programmed to a D-state including D0, or if the Downstream component requests L1 entry (ASPM) and receives positive acknowledgement for the request. Exit from L1 is initiated by an upstream initiated transaction targeting the Downstream component, or by the Downstream component's desire to initiate a transaction heading upstream. Transition from L1 to L0 is typically a few microseconds. TLP and DLLP communication over a Link that is in L1 is also prohibited.

Meanwhile, in transmitting and receiving data between the two components of FIG. 4, the upstream means that the root complex 41 corresponding to the control unit of FIG. 1 receives data (Rx) from the Endpoint 48 or 49 that currently performs a PCI communication interface, and the downstream means that the root complex 41 corresponding to the control unit of FIG. 1 transmits data (Tx) to the Endpoint 48 or 49 corresponding to a device.

Accordingly, if the BIOS enables the ASPM of the root complex, it means that interface units of Tx units 41*a*/41*b* and Rx units 41*c*/41*d* are enabled to enter the L0s or L1 state in FIG. 4.

In addition, if the ASPM is enabled at the Endpoints, it means that the Tx units 48*a*/49*b* and the Rx units 48*c*/49*d* are enabled to enter the L0s or L1 state in FIG. 4.

The power management states are transited as described above, whereby the Link power management state in the Rx and Tx enters the L0s or L1 state, and thus, power can be saved.

FIG. 5 is a block diagram showing a case using a switch in the PCI-E structure (fabric topology) of FIG. 3.

As shown in the figure, the PCI-E structure is configured to comprise a root complex 51 corresponding to a chipset, i.e., a control unit, Endpoints 58 and 59 corresponding to devices, and a switching means 55 for connecting the root complex and the Endpoints.

The switching means is to implement P2P in the PCI-E as described in FIG. 3.

Figure 6:
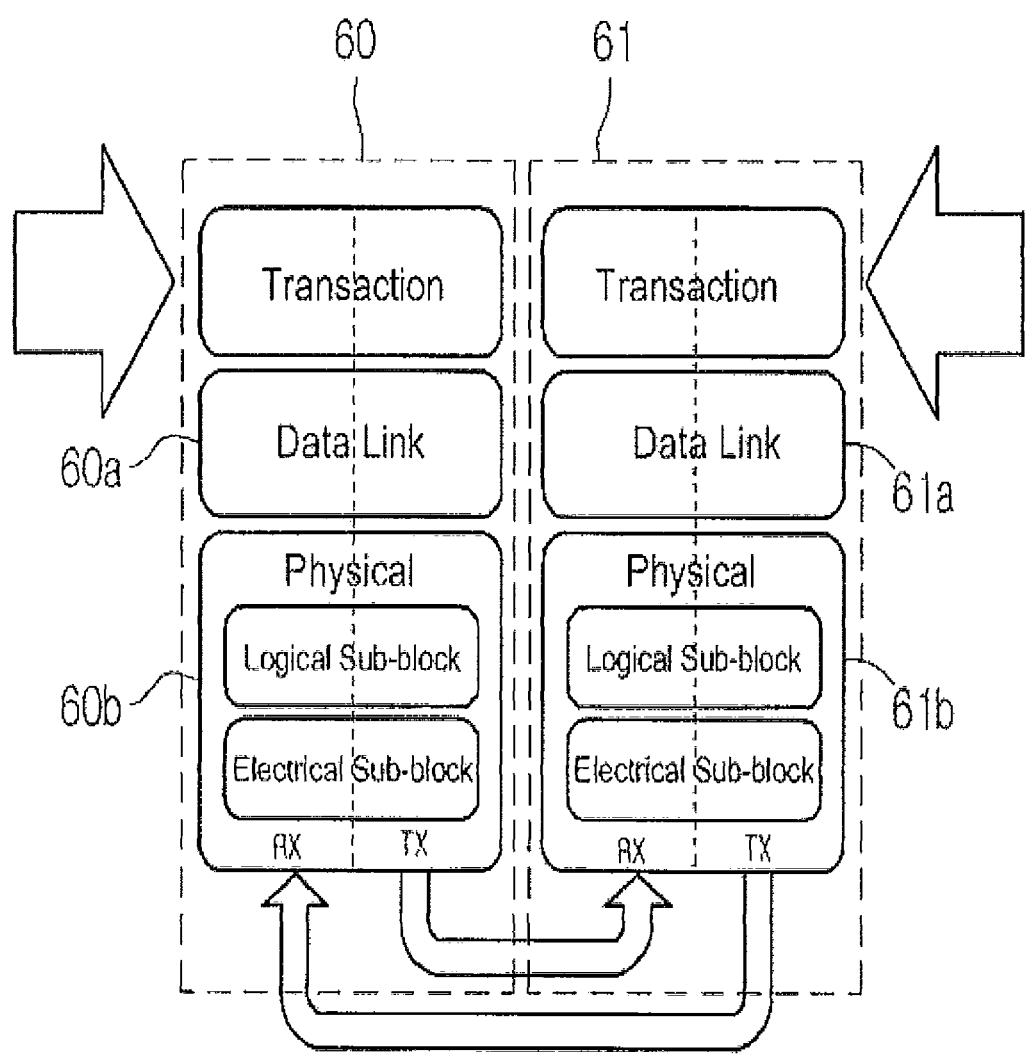
FIG. 6 is a view showing a transaction layer overview in which transmission and reception of data is performed between two components shown in FIGS. 1, 2, and 4, for example, the control unit and the device, the components A and B, and a root complex and Endpoints.

FIG. 6 is a view showing a transaction layer overview in which transmission and reception of data is performed between two components shown in FIGS. 1, 2, and 4, for example, the control unit and the device, the components A and B, and the root complex and the Endpoints.

As shown in the figure, each transmitter and receiver stores communication layers 60 and 61 predetermined for transmitting and receiving data and communication protocols needed for the respective layers.

In the figure, a data link layer 60*a* adds information on the receiving side 61 to the data and information received from an upper layer of the transmit side 60 (e.g., the network layer or the like) (not shown) in the form conforming to the protocol of the network, and the physical layer 60*b* converts and encodes the data and information received from the data link layer into signals, for example, binary digits and transmits the converted and encoded data to a physical layer 61*b* of the receiving side 61.

The physical layer 61*b* of the receiving side 61 converts the received signal into data and transmits the converted data to a data link layer 61*a*.

In the meantime, since the transmission/reception sides are changed to reception/transmission sides based on bidirectional communication in the transaction described above, roles of transmitter and receiver are changed (Rx/Tx) and then performed.

Figure 7A:
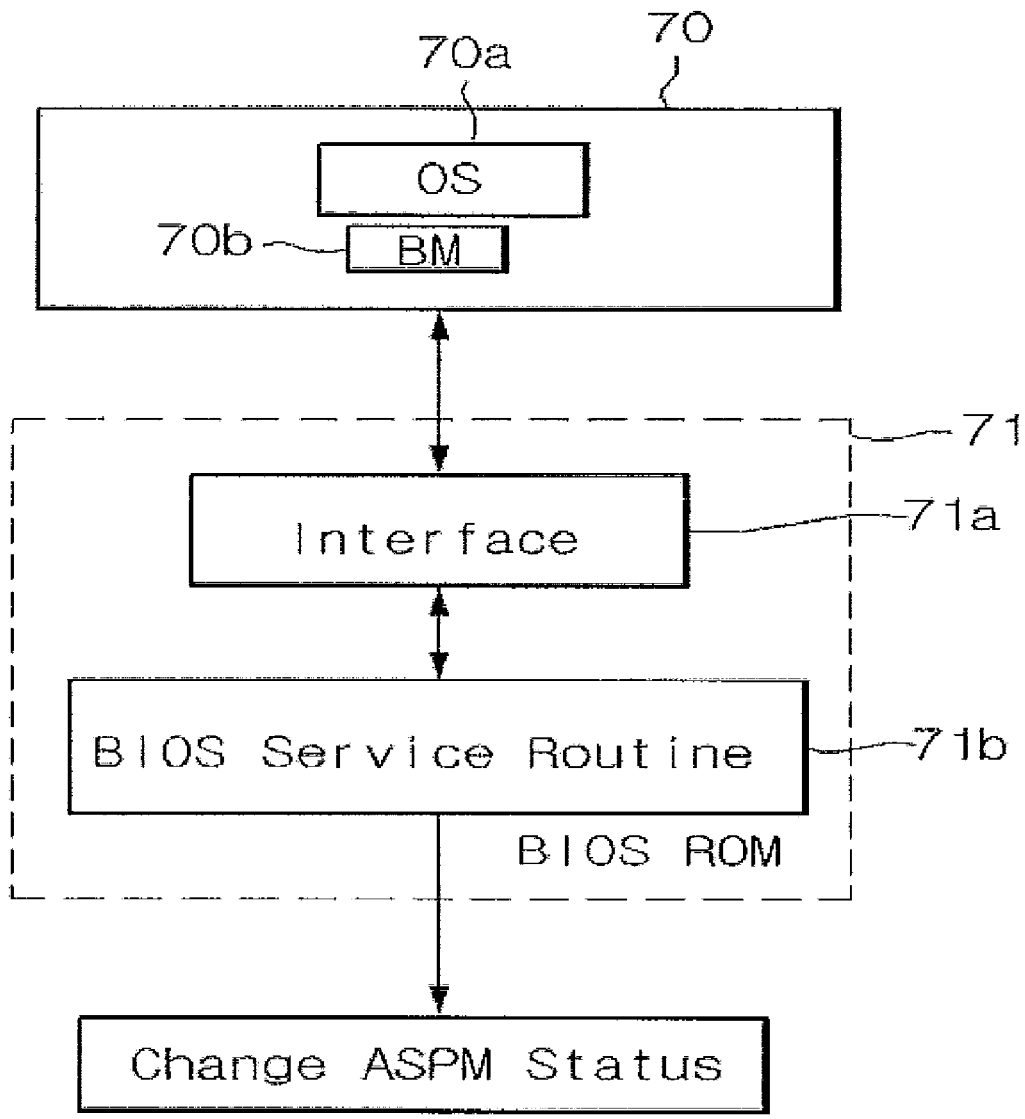
FIG. 7a is a block diagram including a driver, e.g., a battery miser (an application program for Link power management), to be operated in association with a BIOS in order to implement power management ASPM of the PCI-E.

FIG. 7*a* is a block diagram including a driver, e.g., a battery miser, to be operated in association with a BIOS in order to implement power management ASPM of the PCI-E.

As shown in the figure, the memory unit 70 (e.g., HDD or RAM) stores the operating system 70*a* for operating the ASPM of the present invention in association with the BIOS and the battery miser 70*b* that is an application program, wherein the battery miser is a RAM resident program.

In addition, a BIOS ROM 71 stores an interface (WMI-ACPI) unit 71*a* for transmitting and receiving data between devices and a BIOS service routine 71*b* for controlling the ASPM of the present invention.

Through the operations of the battery miser, BIOS, and filter driver, the ASPM is controlled to be enabled or disabled in consideration of the state of each device, input power sources, and/or the remaining amount of any one or more of the input power sources.

It is apparent that enable or disable control of the ASPM can be performed arbitrarily by a user.

The battery miser obtains the operating state of the system and transfers a command to the BIOS so that the ASPM may be set (enabled or disabled) based on the operating state. The BIOS receiving the command controls settings of the ASPM and sets a register of the control unit with the set ASPM information That is, a Link power management state (e.g., in which a state may be L0s or L1, or the ASPM function itself may be disabled) previously determined to be enabled or disabled depending on the operating state of the system may be changed as set previously. Then, whether the corresponding Link power management state is enabled or disabled as set is set in the register.

Figure 7B:
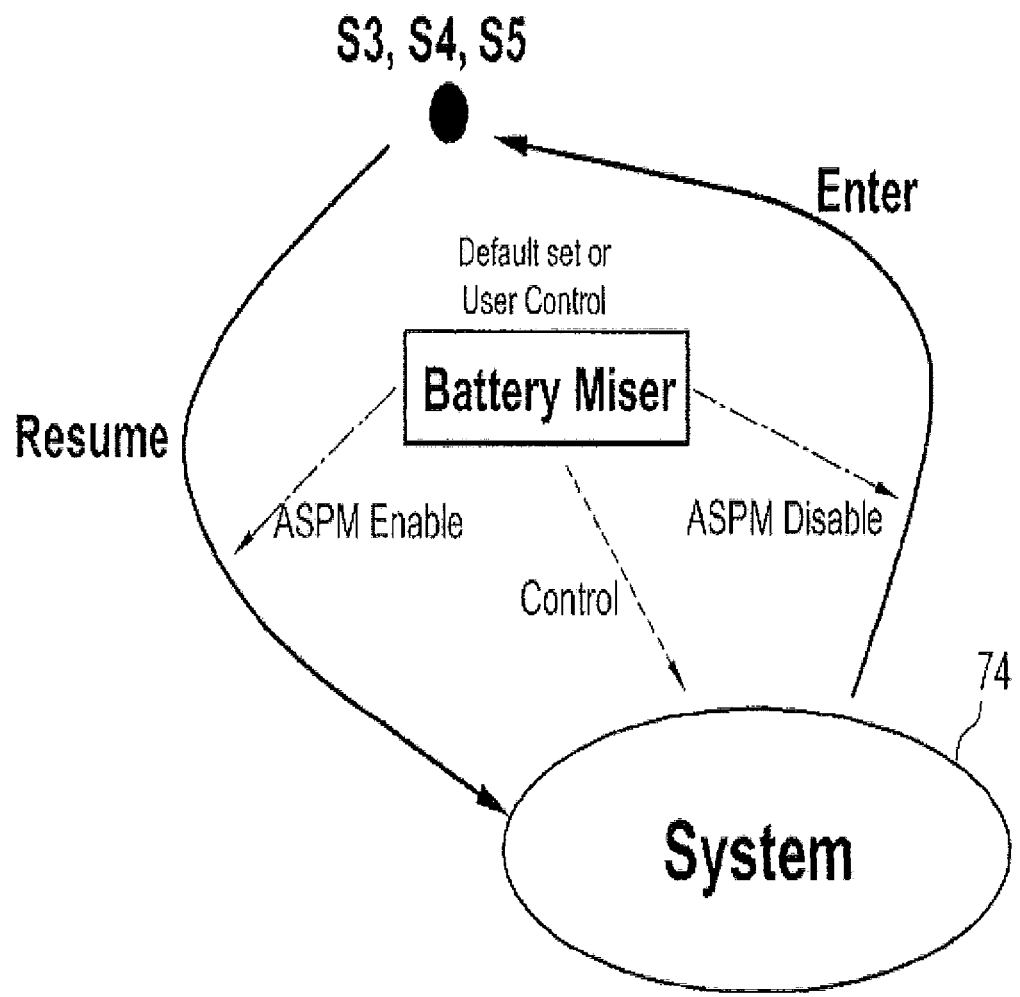
FIG. 7b is an embodiment showing enabling or disabling ASPM depending on the state of the system using the battery miser.

FIG. 7*b* is an embodiment showing enabling or disabling ASPM depending on the state of the system using the battery miser.

First, when the operating state of the system 74 enters S3, S4, or S5 from S0, S1, or S2, ASPM is disabled.

On the other hand, when the system state is resumed from S3, S4, or S5, the ASPM is enabled.

The ASPM may be set to be automatically enabled or disabled by the battery miser or the BIOS based on the system operating state, or a user may control to enable or disable the ASPM by inputting one or more predetermined keys.

It has been already described that the system operating states S0 to S5 and the like are based on Advanced Configuration and Power Interface Specification (ACPI) states defined by several companies including I company.

Figure 8:
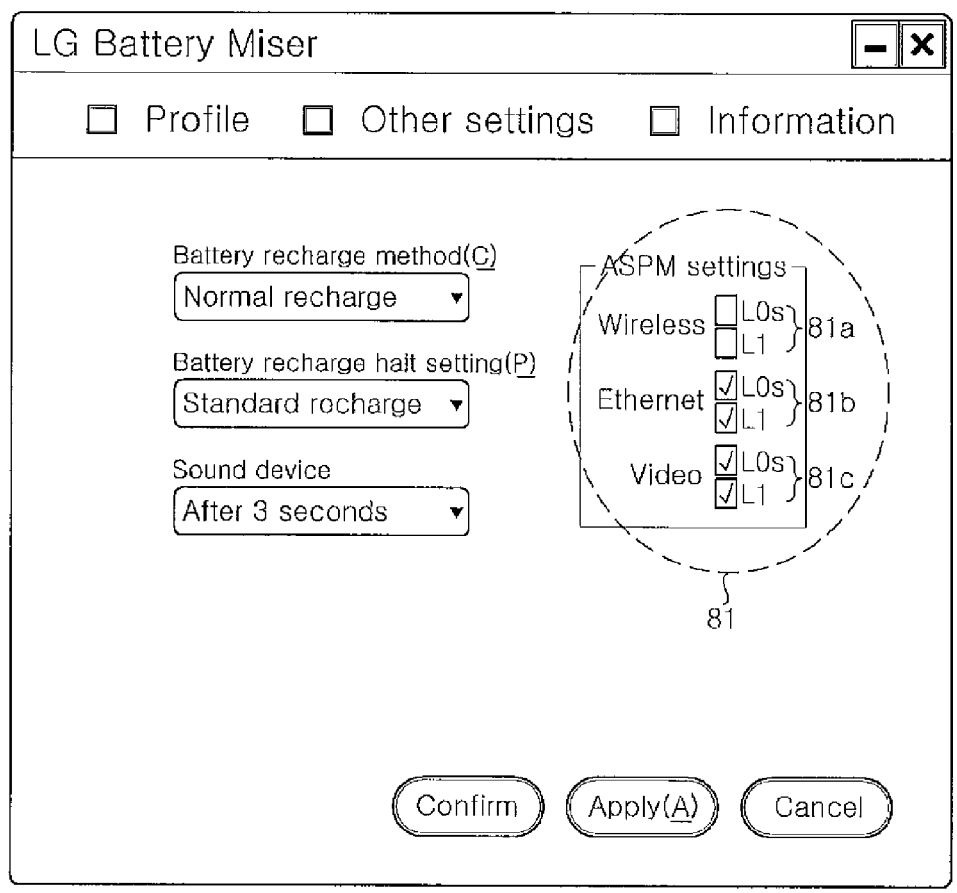
FIG. 8 is a view showing an user interface for setting ASPM of each device connected to the control unit using the battery miser.

FIG. 8 is a view showing an user interface for setting ASPM of each device connected to the control unit using the battery miser.

Basically, the system and the respective devices (wireless LAN, Ethernet LAN, video card, turbo memory, and the like) transmit and receive data based on the PCI-E scheme.

The battery miser confirms whether the system state is changed and then changes a PCI-E Link state. For example, when the system operating state is changed from S0, S1, or S2 to S3, S4, or S5, the battery miser informs the BIOS so that a specific Link power management state (e.g., L0s or L1) defined in the ASPM or the ASPM function itself is disabled.

On the other hand, after the system operating state is resumed from S3, S4, or S5, the L0s or L1 state of the ASPM is caused to be enabled.

The enable or disable operation of the ASPM may be controlled for each device (wireless LAN, Ethernet LAN, video card, turbo memory, or the like) 81.

In addition, it has been already described that the ASPM may be set in consideration of the operating state of the system and/or the operating state of each device.

Although it is general that the ASPM is automatically enabled or disabled by an application program, e.g., the battery miser or the BIOS, the ASPM may be enabled or disabled by a user.

For example, a user may change the PCI-E Link state for the ASPM using one or more predetermined input means (e.g., setting of a hot key, or combination of predetermined keys). In addition, the PCI-E Link state may be set even for each device 81b or 81c.

The process of enabling or disabling the ASPM and/or the enabled or disabled state thereof may be displayed on an output means.

Meanwhile, in implementing the ASPM of the PCI-E, the ASPM may be enabled or disabled in consideration of the type and current state of operating power, as well as the states of the system and each device. In addition, the ASPM may be manually or automatically enabled or disabled referring to the types and/or methods of setting the ASPM described above.

Table 1 shows types of input power sources and ASPM settings based on Windows power policies on how to employ system operations.

TABLE 1

ASPM settings based on system operation policies
(Windows power policies)

| Input power | High Performance | Balanced | Power saving | Remarks |
|---|---|---|---|---|
| AC | Off (Disabled) | L0s | | L0s/L1 |
| DC | Off (Disabled) | L0s/L1 | | L0s/L1 |

As shown in the foregoing, if the system is desired to operate in high performance of the system operation policies, the system is caused to stay in an off state where the ASPM is not set (disabled), so that the system may immediately start to operate.

On the other hand, if the system is desired to operate in a balanced state, the ASPM is set accordingly. In this case, although the ASPM may be set differently for each type of power source (AC/DC) as shown in Table 1, it is not limited thereto.

In addition, if the system is desired to operate in a power saving mode, the ASPM is set accordingly. In this case, although the ASPM may be set as shown in Table, it is not limited thereto.

In setting the ASPM as shown in FIG. 8 and Table 1, a current state of the power to be used, the system operation policy according to the power state and the like may be considered.

TABLE 2

Remarks on ASPM settings considering battery capacity and system operation policies

| Battery capacity | System operation policy | ASPM settings | Remarks |
|---|---|---|---|
| Over 75% | High Performance | Disable | |
| 50%~75% | Balanced | Maintain preset state | |
| Below 50% | Power saving | Enable | |

The settings and the setting operations of the present invention may be performed using the battery miser and the BIOS and/or using one or more input means previously determined by a user.

Figure 9:
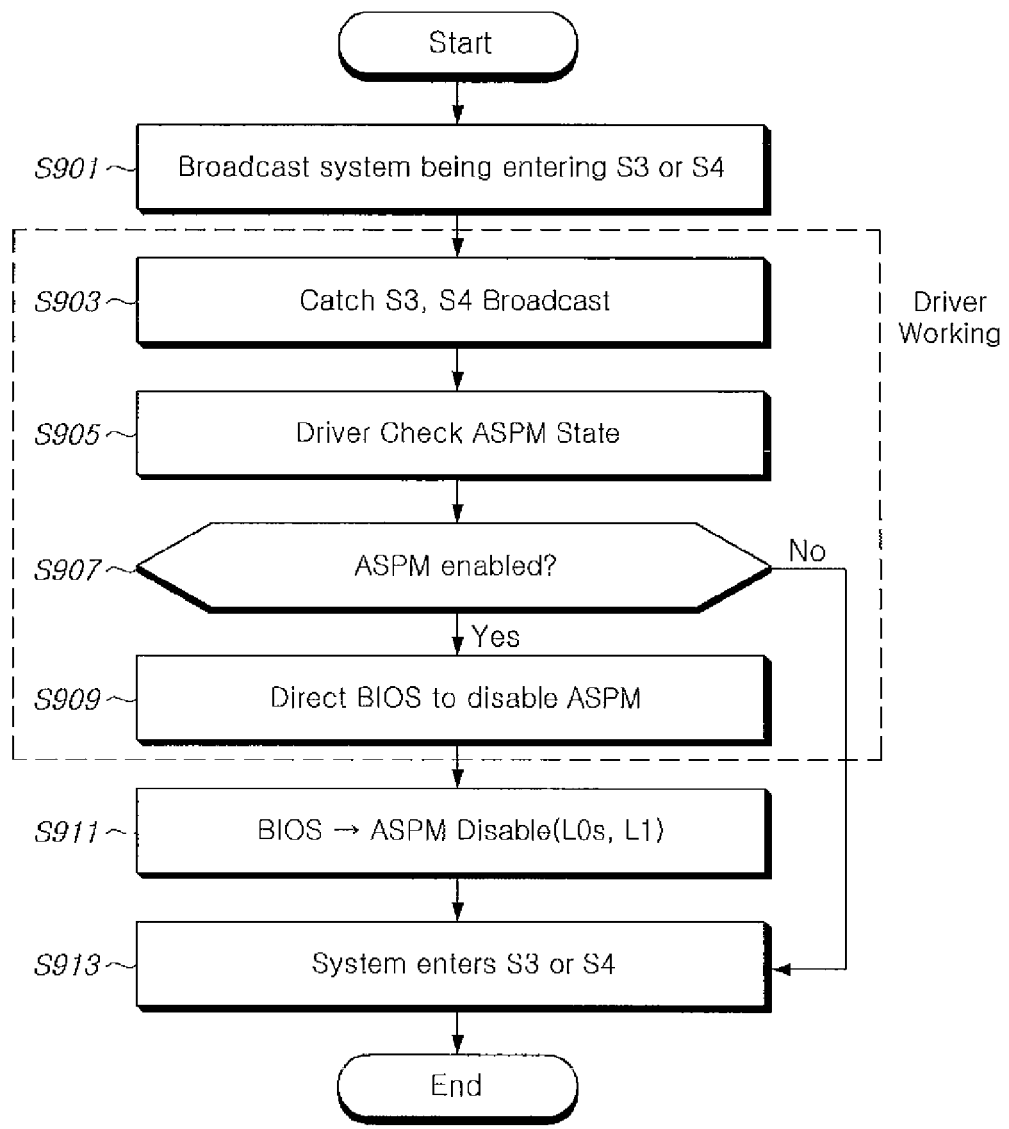
FIG. 9 is a flowchart illustrating the steps of disabling an L0s or L1 state among the ASPM states of PCI-E by the BIOS when the operating state of the system enters an S3 or S4 state.

FIG. 9 is a flowchart illustrating the steps of disabling the L0s or L1 state among the ASPM states of PCI-E by the BIOS when the operating state of the system enters the S3 or S4 state.

As shown in the figure, when the operating state of the system enters the predetermined S3 or S4 state, entry into the state is broadcasted, and the battery miser stored in the HDD detects the state (steps S901 and S903).

When the operating state of the system becomes the S3 or S4 state, the entry into the S3 or S4 state is broadcasted by the operating system. The operating system provides information of the current entry when the operating system enters the S3, S4, or S5 state from the working state, the S0 state, and the entry into the S0 state when the operating state is resumed.

Then, the battery miser confirms the current ASPM state of the PCI-E (step S905).

As a result of the confirmation, if the ASPM is enabled for the L0s or L1 state, the BIOS is directed to disable the entry into the L0s or L1 state or to turn off the ASPM function itself (steps S907 and S908).

The BIOS sets a register value of the control unit (north/south bridge) based on the control command so that the currently set ASPM may be disabled.

The system enters the S3 or S4 state, and the state is maintained (step S913).

Steps S903 to S909 are performed by the battery miser.

Figure 10:
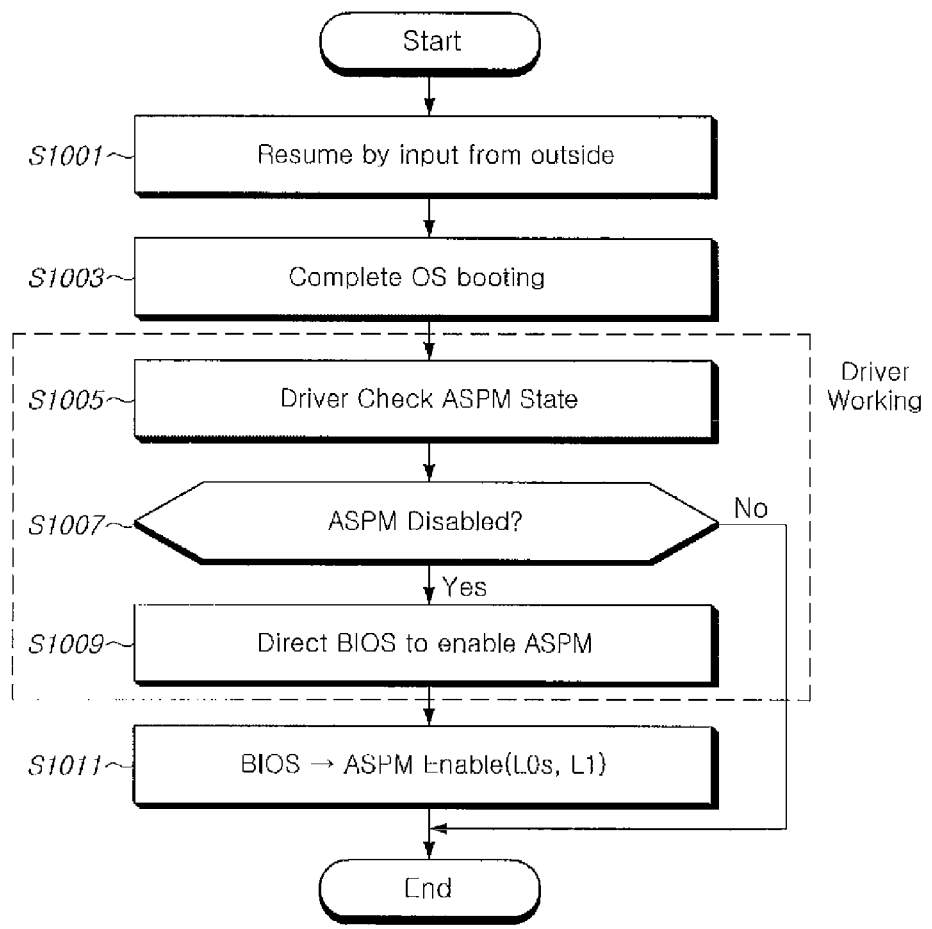
FIG. 10 is a flowchart illustrating the steps of enabling the L0s or L1 state among the ASPM states of PCI-E by the BIOS when the operating state of the system is resumed from the S3 or S4 state.

FIG. 10 is a flowchart illustrating the steps of enabling the L0s or L1 state among the ASPM states of PCI-E by the BIOS when the operating state of the system is resumed from the S3 or S4 state.

As shown in the figure, the operating state of the system is resumed from the S3 or S4 state by a user input or data reception, and the operating system is then booted (step S1001 and S1003).

The battery miser confirms the current ASPM state of the PCI-E (step S1005).

As a result of the confirmation, if the ASPM is disabled, the battery miser directs the BIOS to enable the ASPM state (steps S1007 and S1009).

The BIOS sets a register value of the control unit (north/south bridge) based on the control command so that the currently set ASPM may be enabled (step S1011), and the system starts to operate based on the setting (steps 1001 and S1003).

Steps S1005 to S1009 are performed by the battery miser.

On the other hand, since the ASPM may be already enabled when the system is resumed, through a process of confirming the set value of the ASPM from the register, if the ASPM is already enabled, the ASPM is caused to operate in the enabled state without any additional operation.

The aforementioned case is also applied to a case where the ASPM is not disabled when the system enters the S3 or S4 state. That is, since the ASPM may be already disabled when the system enters the S3 or S4 state, through the process of confirming the set value of the ASPM from the register, if the ASPM is already disabled, the ASPM is caused to operate in the disabled state without any additional operation.

As described above, in the power management control apparatus and method according to the respective embodiments of the present invention, a Link power management state that is in an active state between a chipset and a device that is a control unit, for example, Active State Power Management (ASPM) that is a power management state for managing an L0s and L1 state, is disabled when a system enters a predetermined operating state, for example, an S3 or S4 state, and the disabled ASPM state (L0s or L1) is reactivated when the system is resumed, thereby supporting the L0s and L1 states which are Link power management states between the chipset and the device.

In addition, the power management ASPM of the present invention may be controlled depending on the use state of a system, the type of power source, the remaining amount of a battery, and the like.

This invention may be conveniently implemented using a conventional general purpose digital computer or microprocessor programmed according to the teachings of the present specification, as will be apparent to those skilled in the computer all. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

The aforementioned preferred embodiments of the present invention are disclosed for illustrative purposes. It will be apparent that those skilled in the art can make various modifications, changes, substitutions, or additions thereto within the technical spirit and the scope of the invention disclosed in the appended claims.

What is claimed is:

1. A power management control apparatus, comprising:
 a memory unit configured to store a Basic Input/Output System (BIOS) and a program for
  disabling a power management function for a predetermined link power state of a computer system when the computer system enters a suspend state from a working state, and
  enabling the disabled power management function when the computer system is resumed into the working state from the suspend state;
 a processor configured to access the memory unit and to execute the program when the computer system switches between the working state and the suspend state; and
 a control unit connected to the processor and the memory unit and configured to manage Link power of a link using the BIOS based on a result of executing the program,
 wherein the link is a dual-simplex communications channel established between the control unit and a peripheral device.

2. The apparatus as claimed in claim 1, wherein the memory unit is further configured to store the program, an operating system, and the BIOS to manage the Link power, and
 wherein the control unit is further configured to manage the Link Power using the program, the operating system, and the BIOS in association with one another.

3. The apparatus as claimed in claim 1, wherein the memory unit includes at least one of a hard disk drive (HDD) and read only memory (ROM) to store the program, and
 wherein the control unit is further configured to perform Link power management in association with one or more of the operating system and the BIOS.

4. The apparatus as claimed in claim 1, wherein the suspend state is a suspend to Random Access Memory (RAM) state or an operating state of the computer system consuming less power than the suspend to RAM state.

5. The apparatus as claimed in claim 1, wherein the suspend state is an S3 or S4 state among system operating states defined in the Advanced Configuration and Power Interface (ACPI) standard and the working state is an S0 state among the system operating states defined in the ACPI.

6. The apparatus as claimed in claim 1, wherein the predetermined link power state includes all link states defined in an Active State Power Management (ASPM) specification.

7. The apparatus as claimed in claim 1, wherein the processor includes a central processing unit (CPU).

8. The apparatus as claimed in claim 1, wherein the link supports at least one set of unidirectional differential signal pairs.

9. The apparatus as claimed in claim 8, wherein the link is established in a PCI Express scheme.

10. The apparatus as claimed in claim 1, wherein the control unit is an input and output controller for the peripheral device connected via the link.

11. The apparatus as claimed in claim 10, wherein the control unit is a north bridge chipset or a south bridge chipset.

12. The apparatus as claimed in claim 1, wherein the predetermined link power state of the link includes a standby state.

13. The apparatus as claimed in claim 12, wherein the standby state corresponds to a state where a resume latency is required for the link.

14. The apparatus as claimed in claim 12, wherein the standby state is an L0s or L1 state defined in an Active State Power Management (ASPM) specification.

15. The apparatus as claimed in claim 1, wherein the power management function is maintained as enabled while the computer system is working in the working state.

16. A power management control method, the method comprising:
 detecting a change of an operating state of a computer system between a working state and a suspend state;
 determining whether or not a current link power state of a link is a predetermined link power state, wherein the link is a dual-simplex communications channel for a connection to a peripheral device; and
 enabling or disabling a power management function for the predetermined link power state based on a result of the determining step,
 wherein the power management function for the predetermined link power state is maintained as enabled until the change of the operating state of the computer system between the working state and the suspend state is detected again.

17. The method as claimed in claim 16, wherein the detecting step detects the change of the operating state when the operating state of the computer system changes from the working state to the suspend state or enters the working state from the suspend state.

18. The method as claimed in claim 17, wherein the step of enabling or disabling the power management function for the predetermined link power state includes disabling the power management function if the operating state of the computer system changes from the working state to the suspend state.

19. The method as claimed in claim 17, wherein the step of enabling or disabling the power management function for the predetermined link power state includes enabling the power management function if the operating state of the computer system changes from the suspend state to the working state.

20. The method as claimed in claim 17,
    wherein the working state is an S0 state and the suspend state is an S3 or S4 state, and
    wherein the S0, S3 and S4 states are defined in the Advanced Configuration and Power Interface (ACPI) standard.

21. The method as claimed in claim 16, wherein the predetermined link power state is an L0s or L1 state defined in an Active State Power Management (ASPM) specification.

22. The method as claimed in claim 16, wherein the detecting step includes detecting that information indicating the change of the operating state of the computer system is broadcasted.

23. The method as claimed in claim 22, wherein the power management function is enabled or disabled in association with a Basic Input/Output System (BIOS) in the step of enabling or disabling.

24. The method as claimed in claim 23, wherein the BIOS sets a register value of a control unit to enable or disable the power management function for the predetermined link power state in accordance with the instruction from the BIOS.

25. The method as claimed in claim 16, wherein the enabling or disabling step determines whether to enable or disable the power management function for the predetermined link power based on one or more conditions of a system operation policy, a power supply state, and remaining amount of a battery.

26. A power management control method, the method comprising:
    disabling a power management function for a predetermined link power state of a link upon detecting that an operating state of a computer system is entering a suspend state from a normal operating state,
    wherein the link is a dual-simplex communications channel for a connection to a peripheral device, and
    wherein the power management function is maintained as disabled until the computer system enters the normal operating state; and
    enabling the disabled power management function upon detecting that the operating state of the computer system is entering the normal operating state from the suspend state,
    wherein the power management function is maintained as enabled until the computer system enters the suspend state.

27. The method as claimed in claim 26, wherein the normal operating state corresponds to an S0 state defined in the Advanced Configuration and Power Interface (ACPI) standard, and the suspend state corresponds to an S3 or S4 state defined in the ACPI.

28. The method as claimed in claim 26, wherein the predetermined link power state is an L0s or L 1 state defined in an Active State Power Management (ASPM) specification.

29. The method as claimed in claim 26, wherein the predetermined link power state includes all states defined in an Active State Power Management (ASPM) specification.

30. The method as claimed in claim 26, wherein the steps of enabling and disabling the predetermined link power state are determined based on one or more conditions of a system operation policy, a power supply state, and a remaining amount of a battery.

31. A computer program product embodied on a non-transitory computer-readable storage medium, the computer program product comprising:
    a first computer code configured to determine when a computer system enters a suspend state from a working state;
    a second computer code configured to disable a power management function for a predetermined link power state of a link when the first computer code determines the computer system enters the suspend state from the working state, wherein the link is a dual-simplex communications channel for a connection to a peripheral device; and
    a third computer program code configured to enable the disabled power management function when the computer system is resumed from the suspend state,
    wherein the power management function is maintained as enabled until the computer system enters the suspend state.

32. The computer program product as claimed in claim 31, wherein the suspend state is a suspend Random Access Memory (RAM) state or an operating state consuming less power than the suspend RAM state.

33. The computer program product as claimed in claim 31, wherein the suspend state is an S3 or S4 state among system operating states defined in Advanced Configuration and Power Interface (ACPI) standard, and
    wherein the working state is an S0 state among the system operating states defined in the ACPI.

34. The computer program product as claimed in claim 31, wherein the predetermined link power state is an L0s or L1 state defined in an Active State Power Management (ASPM) specification.

35. The computer program product as claimed in claim 31, wherein the predetermined link power state includes all states defined in an Active State Power management (ASPM) specification.

36. A computer apparatus, comprising:
    a control unit configured to manage power of a link, wherein the link is a dual-simplex communications channel for a connection to a peripheral device;
    a storage configured to store executable data related to a power management function for the link; and
    a CPU connected to the storage and the control unit and configured to
        detect a change of an operating state of the computer apparatus between a working state and a suspend state, and
        instruct the control unit to
            disable the power management function for the link upon detecting that the operating state is changed from the working state to the suspend state, and enable the power management function for the link upon detecting that the operating state is changed from the suspend state to the working state.

37. The apparatus as claimed in claim 36, wherein the control unit is further configured to manage power of the link in association with an operating system and a Basic Input/Output System (BIOS).

38. The apparatus as claimed in claim 36, wherein the suspend state is a suspend to Random Access Memory (RAM) or an operating state of the computer system consuming less power than the suspend to RAM state.

39. The apparatus as claimed in claim 36, wherein the working state is an S0 state defined in the Advanced Configuration and Power Interface (ACPI) standard and the suspend state is an S3 or S4 state defined in the ACPI standard.

40. The apparatus as claimed in claim 36, wherein the predetermined link power state of the link includes a standby state.

41. The apparatus as claimed in claim 36, wherein the predetermined link power state of the link includes an L0s or L1 state defined in an Active State Power Management (ASPM) specification.

42. The apparatus as claimed in claim 36, wherein the link is established in a PCI Express scheme.

* * * * *